(12) United States Patent
Piekarz

(10) Patent No.: US 7,517,244 B2
(45) Date of Patent: Apr. 14, 2009

(54) ELECTROMECHANICAL FUNCTIONAL MODULE AS WELL AS A RECEPTACLE HOLDER AND AN APPLIANCE HOLDER

(75) Inventor: Roman Piekarz, Mielec (PL)

(73) Assignee: Bury Sp. z.o.o., Mielec (PL)

( * ) Notice: Subject to any disclaimer, the term of this patent is extended or adjusted under 35 U.S.C. 154(b) by 285 days.

(21) Appl. No.: 11/413,055

(22) Filed: Apr. 28, 2006

(65) Prior Publication Data

US 2006/0246943 A1 Nov. 2, 2006

(30) Foreign Application Priority Data

May 2, 2005 (DE) .................... 10 2005 020 762

(51) Int. Cl.
*H01R 13/60* (2006.01)
(52) U.S. Cl. .................................... 439/527
(58) Field of Classification Search ........... 439/527, 439/327, 357–358
See application file for complete search history.

(56) References Cited

U.S. PATENT DOCUMENTS

| | | | | |
|---|---|---|---|---|
| 3,582,867 A | 6/1971 | Thompson | .................... | 339/92 |
| 5,138,245 A * | 8/1992 | Mattinger et al. | ............ | 320/115 |
| 5,159,256 A * | 10/1992 | Mattinger et al. | ............ | 320/115 |
| 5,904,415 A * | 5/1999 | Robertson et al. | ............ | 362/260 |

FOREIGN PATENT DOCUMENTS

| | | |
|---|---|---|
| DE | 23 62 060 | 6/1975 |
| DE | 199 58 325 A1 | 6/2001 |
| DE | 102 43 313 | 4/2004 |

* cited by examiner

*Primary Examiner*—Jean F Duverne
(74) *Attorney, Agent, or Firm*—Whitham Curtis Christofferson & Cook, PC

(57) ABSTRACT

An electromechanical functional module having a receptacle holder (1*a*, 1*b*) and an appliance holder (2*a*, 2*b*) for an electronic appliance, in which the receptacle holder (1*a*, 1*b*) has mechanical locking elements (3*a*, 3*b*) for engagement in the appliance holder (2*a*, 2*b*) and locking of the appliance holder (2*a*, 2*b*) on the receptacle holder (1*a*, 1*b*), and has a receptacle contour which corresponds to the shape of the appliance holder (2*a*, 2*b*), has type-specific projections (6) and/or depressions (7) on the receptacle contour, which is standardized for all types and is otherwise identical for different receptacle holder types (1*a*, 1*b*) in a range, of the receptacle holders (1*a*, 1*b*) and on the appliance holders (2*a*, 2*b*), in such a manner that an appliance holder (2*a*) which is intended for a first receptacle holder type (1*a*) is no longer suitable to be accommodated by a second receptacle holder type (1*b*) in the same range.

9 Claims, 1 Drawing Sheet

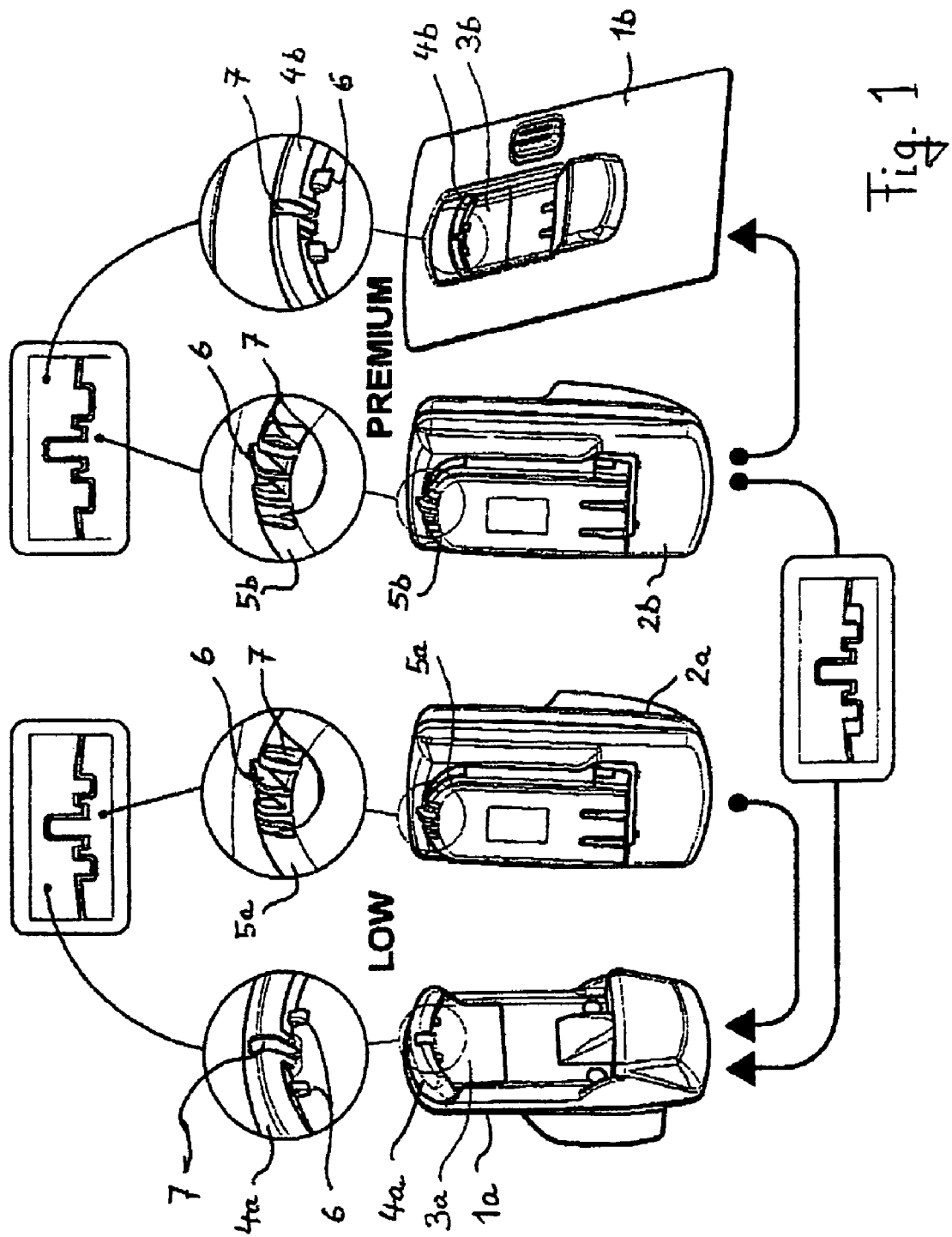

ELECTROMECHANICAL FUNCTIONAL MODULE AS WELL AS A RECEPTACLE HOLDER AND AN APPLIANCE HOLDER

The invention relates to an electromechanical functional module having a receptacle holder and an appliance holder for an electronic appliance, with the receptacle holder having mechanical locking elements for engagement in the appliance holder and locking of the appliance holder on the receptacle holder, and having a receptacle contour which corresponds to the shape of the appliance holder.

The invention also relates to a receptacle holder and an appliance holder for use in an electromechanical functional module such as this.

An electromechanical functional module such as this may be provided, for example, for a telephone hands-free system for a mobile telephone. Known telephone hands-free systems of this type have an appliance holder which is designed specifically for the respective mobile telephone and is thus able not only to hold the mobile telephone mechanically correctly but also to make electrical contact in accordance with the specific contact arrangement.

Particularly for motor vehicles, it is known for a control arrangement which is arranged in a control box and can be permanently installed in the motor vehicle to interact with an appliance holder such as this. The connection between the respective appliance holder and the control box may in this case be designed in a standardized form, so that different appliance holders for different mobile telephones can be connected to a permanently installed control box. This means that only the associated appliance holder need also be replaced when a mobile telephone is replaced, while the permanently installed control box can remain in the vehicle and is suitable for connection of a different appliance holder which is designed for a different mobile telephone.

The appliance holder is coupled to the control box with the aid of a receptacle holder, which has a receptacle contour, which is standardized for all types for different receptacle holders in a range, for the specific appliance holders. The mobile-telephone-specific appliance holders are then clamped to the receptacle holder, and are detachably locked there, with the aid of mechanical locking elements on the receptacle holder. The receptacle holder itself is permanently installed in the vehicle, or is in turn connected to a holder which is permanently mounted in the vehicle.

In the case of a range with different receptacle holder types which provide different functionalities, a receptacle contour which is standardized for all types is often used for all of the available appliance holders in the range, in order to reduce the tool and manufacturing costs. All of the appliance holders in a range then have a locking contour which is likewise standardized with the receptacle contour which is standardized for all types, in order to lock the appliances in any of the receptacle holders, irrespective of the receptacle holder type. The standardized receptacle and locking contour is normally manufacturer-specific.

However, the conventional embodiments have the disadvantage that if the functional scope of the receptacle holders cannot be seen from the outside, the electronic appliance cannot carry out a function when this function is not supported by the receptacle holder, and the reason is not evident to the user.

In general, it is therefore preferred for the receptacle contours of receptacle holders and appliance holders to be matched on a type-specific basis, which leads to increased manufacturing effort.

It is also known for the functional scope that is provided to be restricted with the aid of control software as a function of the respective type of receptacle holder, appliance holder and/or electronic appliance.

The object of the invention is thus to provide an improved electromechanical functional module of the type mentioned initially as well as an improved receptacle holder and appliance holder for it, by means of which the tool and manufacturing costs can be reduced, and in the case of which interaction is nevertheless ensured between an appliance holder and a receptacle holder, as a function of the receptacle holder type and appliance holder type.

The object is achieved by the electromechanical functional module in that type-specific projections and/or depressions are provided on the receptacle contour, which is standardized for all types and is otherwise identical for different receptacle holder types in a range, of the receptacle holders and on the appliance holders, in such a manner that an appliance holder which is intended for a first receptacle holder type is no longer suitable to be accommodated by a second receptacle holder type in the same range.

The use of a receptacle contour which is standardized for all types has the advantage that the tools for the receptacle holder and appliance holder can be identical for the shaping of the receptacle contour. Only additional projections and/or depressions are fitted on a type-specific basis during manufacture. This can easily be done with the aid of movable fingers using a standardized tool for injection-molding manufacture.

Furthermore, the mechanical coding of the receptacle system which is provided by the projections and/or depressions prevents the impression of a defective electronic appliance being given when an appliance holder is inserted into a receptacle holder with reduced functionality, if this electronic appliance does not provide a function which is not supported by the receptacle holder. This assumes that the user knows the functional scope for which his appliance holder is intended since, during normal operation, the appliance holder is user-specific and is used only with a plurality of receptacle holders in different vehicles, for example in his own vehicle and a rented vehicle.

It is particularly advantageous for the projections and/or depressions to be designed to be backward-compatible in such a manner that appliance holders for higher-quality receptacle holder types are suitable for accommodation by lower-quality receptacle holder types, and appliance holders for lower-quality receptacle holder types are not suitable for accommodation by higher-quality receptacle holder types.

It is thus possible to provide a range with receptacle holders and associated appliance holder types in a different price and function category. Premium variants of appliance holders thus fit into all of the lower-level variants including a low variant of receptacle holder types in the range. In contrast, low-price appliance holders do not fit into receptacle holders in a higher-price class. Mechanical coding such as this may, of course, also be extended to a plurality of levels, that is to say with at least one intermediate variant being coded between the low variant and the premium variant.

The quality of the receptacle holder types may, for example, be dependent on the electrical functional scope of the receptacle holders, which have control electronics and/or electrical contacts. The projections and/or depressions are thus arranged in a defined manner as a function of the functional scope provided by the respective receptacle holder type. The matching appliance holders for this purpose are provided with appropriate corresponding locking contours.

It is particularly advantageous for the receptacle holder to have a locking section which is mounted such that it can move and has a collar for clasping a projection on the appliance holder, and for the projections and/or depressions to be arranged on the locking section. The mechanical coding is thus provided at the time of mechanical locking when an attempt is made to insert the projection on the appliance holder into the collar of the locking section of the receptacle holder, and to move the locking section into the receptacle holder, in order to latch in the appliance holder. If the projections and/or depressions on the receptacle holder and appliance holder do not match one another, the projection on the appliance holder is not clasped, or is not adequately clasped, by the collar so that the appliance holder slides out. The user is immediately aware that the type of receptacle holder is not compatible with the appliance holder, even though both belong to the same range.

Low-cost manufacture with a tool which otherwise remains the same is possible by forming at least one web within the collar, in order to form the projection. This web can be produced by movable fingers in the tool during the injection-molding process for production of the receptacle holder.

Another advantageous feature of these embodiments is for the appliance holder to have a projection in the form of a lip for engagement in the collar of the receptacle holder, and depressions and/or projections of the receptacle holder which interact with the projections and/or depressions. In this case, by way of example, at least one recess for engagement in the at least one web may be formed in the lip. This recess can also be manufactured with the aid of a finger which is mounted such that it can move and is provided in the injection-molding tool.

The receptacle holder is preferably a hands-free device holder which can be mounted in a vehicle, and the appliance holder is preferably a type-specific holder for mobile telephones.

The object is also achieved by a receptacle holder having a receptacle contour which is standardized for all types, and having mechanical locking elements for use in an electromechanical functional module such as this, by the provision of type-specific projections and/or depressions on the receptacle holder.

The object is also achieved by an appliance holder having a locking contour which is standardized for all types, for use in an electromechanical functional module as described above, by the provision of type-specific projections and/or depressions on the appliance holder.

The receptacle holders and appliance holders which have type-specific projections and/or depressions provide a range of different receptacle holder types and appliance holder types with a receptacle contour which is standardized for all types, but in which type-specific interaction can nevertheless be ensured in a simple manner between the appliance holder and the receptacle holder.

The invention will be explained in more detail in the following text using exemplary embodiments and with reference, by way of example, to the attached drawing, in which:

FIG. 1 shows a sketch of a receptacle holder and of an appliance holder, in each case of a low version and a premium version with receptacle contours, in the form of a perspective cross-sectional view, in order to illustrate the backward-compatibility.

FIG. 1 shows an illustration of a first electro-mechanical functional module for a low variant, and of a second electro-mechanical functional module for a premium variant.

The electromechanical functional module in each case comprises a receptacle holder 1a, 1b and an appliance holder 2a, 2b for an electronic appliance. In the described case, the electronic appliance is a mobile telephone which is not illustrated. At their upper end, the receptacle holders 1a, 1b have a locking section 3a, 3b, which is mounted such that it can move and has a collar 4a, 4b for clasping a projection 6 in the upper area of the appliance holder, which has a rounded contour.

The projection 6 on the appliance holders 2a, 2b is plugged into the collar 4a, 4b on the moving locking section 3a, 3b of the receptacle holder 1a, 1b, and the locking section 4a, 4b is pushed upward. The lower area of the appliance holder 2a, 2b is then pushed into the receptacle trough, and the appliance holder 2a, 2b is moved downward in the trough of the receptacle holder 1a, 1b. During this process, the locking section 3a, 3b slides back, and the appliance holder 2a, 2b makes electrical contact with the receptacle holder 1a, 1b by means of contact elements in the lower area of the trough. As can be seen in particular from detailed enlargements, the receptacle holders 1a, 1b are provided in the area of the collar 4a, 4b with a type-specific arrangement of projections 6 and depressions 7. In the case of the low variant, the projections 6 are designed to be narrower, in the form of profiles that are rounded at the front, than the projections 6 on the premium variant of the receptacle holder 1b.

Corresponding projections 6 and depressions 7 are provided in a corresponding manner on the projection 5a, 5b on the appliance holders 2a, 2b. This group of projections 6 and depressions 7 is matched on a type-specific basis to the group of projections 6 and depressions 7 on the receptacle holder 1a, 1b in such a manner that the low-variant of the appliance holder 2a can be inserted into the receptacle holder 1a for the low variant, and the premium-variant of the appliance holder 2b can be inserted into the receptacle holder 1b for the premium variant. On the other hand, the type-specific projections 6 and depressions 7 on the premium variant are designed to be backward-compatible with the low variant, so that the appliance holder 2a slides off the collar 4b on the receptacle holder 1b for the premium variant, in particular because of the narrower depressions 7 on the projection 5a on the appliance holder 2a, since the projections 6 there are broader than the corresponding depressions 7 in the appliance holder 2a for the low variant. This means that a low-variant appliance holder 2a cannot be inserted into the receptacle holder 1b for the premium variant, even though the receptacle contour is otherwise identical.

On the other hand, the appliance holder 2b for the premium variant can be used in conjunction with the receptacle holder 1a for the low variant, since the depressions 7 on the projection 5b on the appliance holder 2b for the premium variant are broader than the projections 6 on the collar 4a of the receptacle holder 1a for the low variant. The appliance holder 2b for the premium variant can thus be inserted without any problems into the locking section 3a of the receptacle holder 1a for the low variant.

The type-specific coding of the appliance holders 2a, 2b and associated receptacle holders 1a, 1b is sketched in the form of a cross section in the upper area of FIG. 1. This clearly shows that the type-specific coding is defined by the width of the projections 6 (profiles) on the collar 4a, 4b of the receptacle holders 1a, 1b, and by the width of the corresponding depressions 7 on the projection 5a, 5b on the appliance holders 2a, 2b.

The lower area shows the backward-compatibility of the appliance holder 2b for the premium variant in the form of a cross-sectional view of the overlap of the type-specific projections 6 and depressions 7 on the appliance holder 2b and on the receptacle holder 1a for the low variant. This clearly shows that the broader depressions 7 on the projection 5*b* on the appliance holder 2*b* for the premium variant allow these depressions 7 to be inserted into the narrower projections 6 on the collar 4*a* of the receptacle holder 1*a* for the low variant.

It is, of course, possible to additionally provide intermediate steps in addition to the illustrated low and premium variants, which are coded in a correspondingly backward-compatible form, with the aid of the projections 6 and depressions 7.

I claim:

1. An electromechanical functional module, comprising:
a receptacle holder; and
an appliance holder for an electronic appliance,
   the receptacle holder having mechanical locking elements for engaging and locking the appliance holder,
   the receptacle holder having a receptacle contour corresponding to the shape of the appliance holder,
   the receptacle holder including a locking section being arranged so as to be moveable and having a collar for grasping a protrusion of the appliance holder and
   the appliance holder being insertable into the receptacle holder only after moving the locking section, wherein
   for different types of receptacle holders of a product line identical standardized receptacle contours are provided,
   projections and/or depressions at the moveable locking section and at the protrusion of the appliance holder so that an appliance holder adapted for being received by a first type of receptacle holder is not adapted for being received by a second type of receptacle holder of same product line.

2. The electromechanical functional module as claimed in claim 1, wherein the projections and/or depressions are designed to be backward-compatible in such a manner that appliance holders for higher-quality receptacle holder types are suitable for accommodation by lower-quality receptacle holder types, and appliance holders for lower-quality receptacle holder types are not suitable for accommodation by higher-quality receptacle holder types.

3. The electromechanical functional module as claimed in claim 1, wherein the quality of the receptacle holder types is dependent on the electrical functional scope of the receptacle holders which have control electronics and/or electrical contacts.

4. The electromechanical functional module as claimed in claim 1, wherein at least one web is formed within the collar, in order to form a projection.

5. The electromechanical functional module as claimed in claim 1, wherein the appliance holder has a lip for engagement in the collar, and depressions and/or projections which interact with the projections and/or depressions of the moveable locking section of the receptacle holder.

6. The electromechanical functional module as claimed in claim 4, wherein at least one recess for engagement in the at least one web is formed in the lip.

7. The electromechanical functional module as claimed in claim 1, wherein the receptacle holder is a holder, which can be mounted in a vehicle, for a hands-free device, and the appliance holder is a type-specific holder for mobile telephones.

8. A receptacle holder having a receptacle contour which is standardized for all types, and having mechanical locking elements for use in an electromechanical functional module as claimed in claim 1, having type-specific projections and/or depressions.

9. An appliance holder having a locking contour which is standardized for all types, for use in an electromechanical functional module as claimed in claim 1, having type-specific projections and/or depressions.

* * * * *